Oct. 15, 1935.  W. L. AVERY  2,017,034
VEHICLE WHEEL
Filed March 15, 1934  3 Sheets-Sheet 1

W. L. Avery
INVENTOR

By Glascock Downing & Seebold
ATTYS.

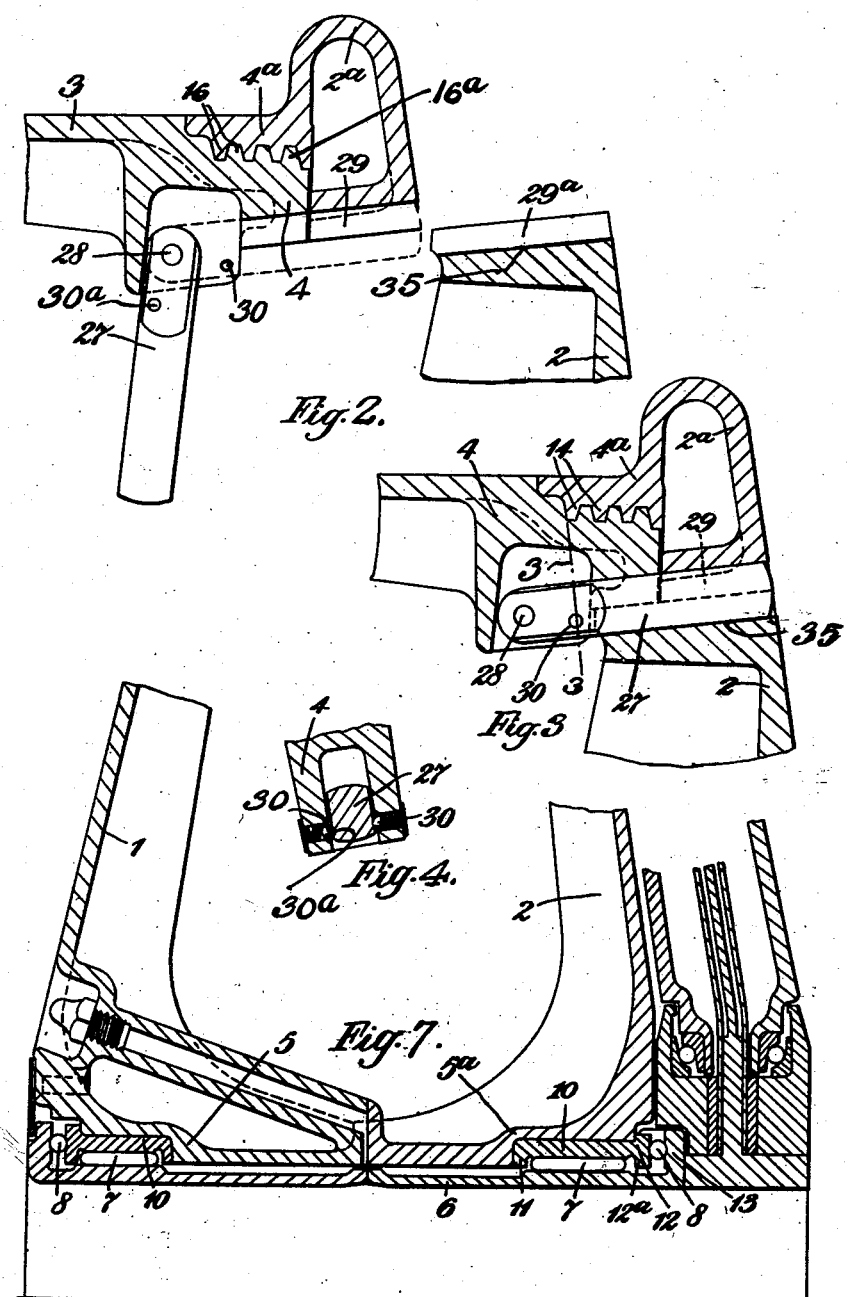

Oct. 15, 1935. W. L. AVERY 2,017,034
VEHICLE WHEEL
Filed March 15, 1934 3 Sheets-Sheet 3
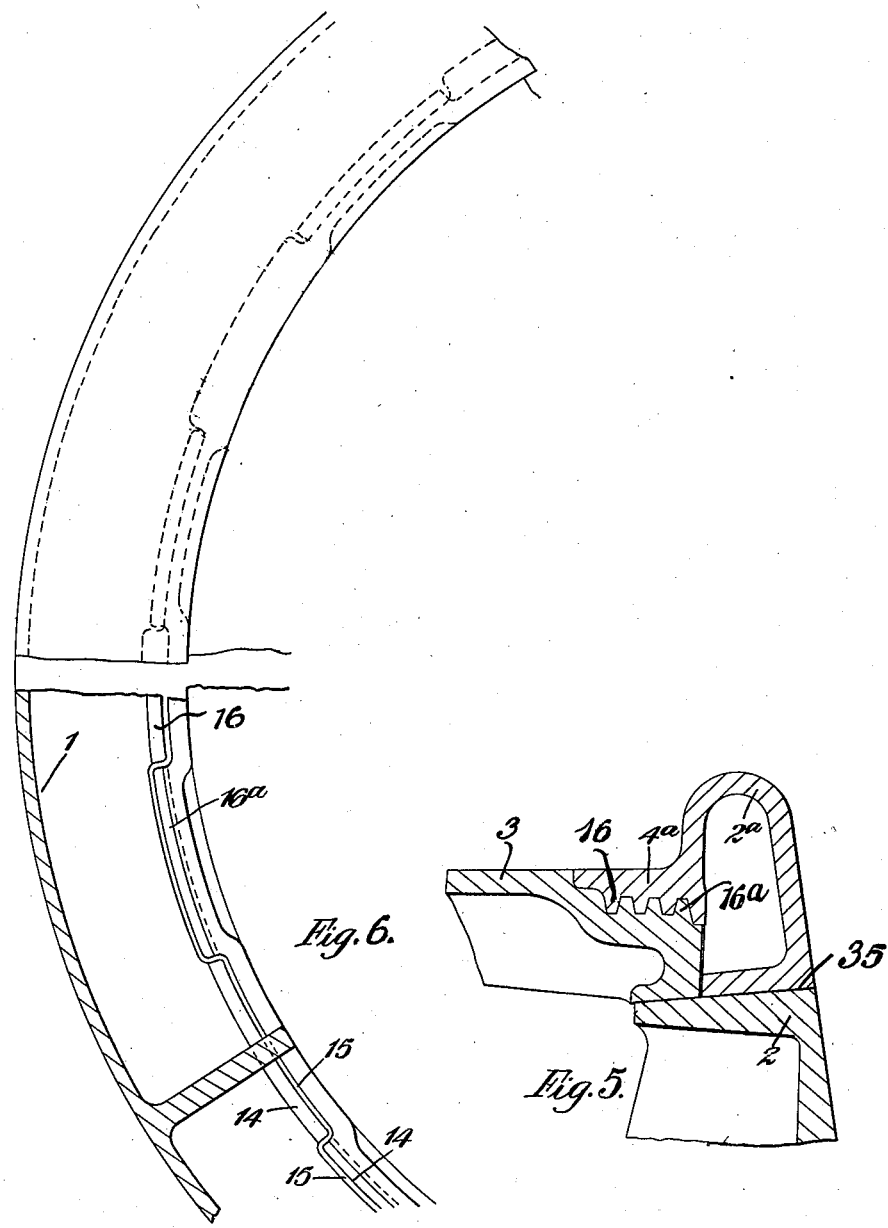

Patented Oct. 15, 1935

2,017,034

UNITED STATES PATENT OFFICE 2,017,034

VEHICLE WHEEL

William Leicester Avery, Thorley, Bishop's Stortford, England

Application March 15, 1934, Serial No. 715,763
In Great Britain March 7, 1933

4 Claims. (Cl. 301—63)

This invention relates to vehicle wheels, and has for its object to provide improvements therein which facilitate the assembly of tyres upon the wheels.

According to the invention a vehicle wheel is provided wherein one of the tyre retaining flanges of the wheel rim is connected with the remainder of the rim through the intermediary of means adapted upon relative rotation between such retaining flange and the remainder of the rim in one direction to secure these parts in engagement with each other and upon relative rotation between the parts in the opposite direction to release them from engagement with each other whereby the said flange may be removed from the wheel.

The invention also consists in the further features to be hereinafter described, illustrated and claimed.

In the accompanying drawings:—

Fig. 2 is an enlarged detail section showing portions of the bodies of the wheel parts separated and also showing one of the pivotal locking pins in two different positions;

Figure 3 is a similar view but showing the position of the wheel body parts when assembled and locked together by the locking pins;

Figure 4 is a section through the line 4—4 of Figure 3 illustrating a detail, and Fig. 5 is a view similar to Fig. 3 but taken in a plane removed from the locking pin;

Fig. 6 is a detail partly in section and partly in elevation showing the cooperating castellations;

Figure 7 is a fragmentary sectional elevation illustrating an improved bearing according to the invention.

In the drawings similar parts are indicated by the same reference numerals.

Figure 1:
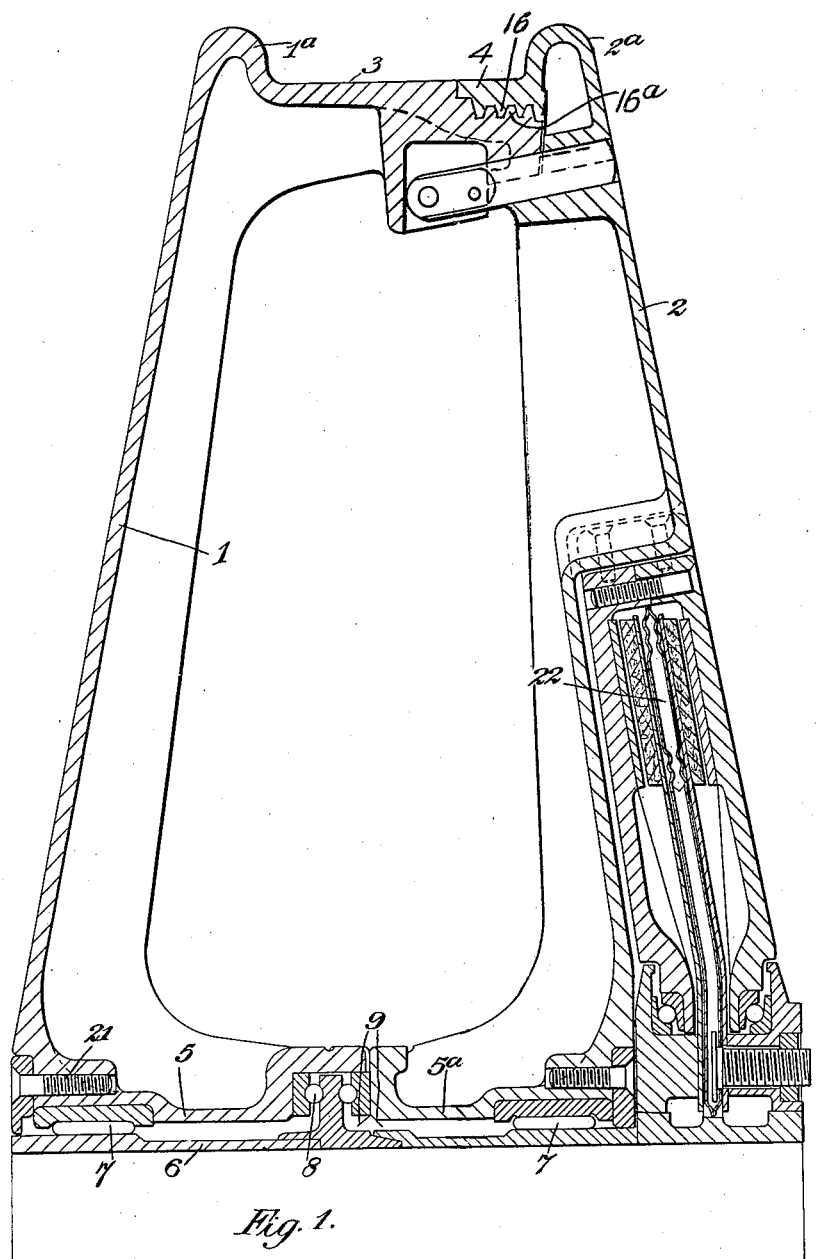
Figure 1 is a sectional elevation of one half of a wheel according to the invention.

According to the form of the invention illustrated in Figures 1 to 6, a stream-lined vehicle disc wheel is provided which is composed of two separable wheel body parts 1, 2 which, when united together, complete the sides of the wheel and the rim 3 thereof, one of the tyre retaining flanges 1ª being carried by the wheel part 1 and the other tyre retaining flange being detachable and designated at 2ª. At the adjacent extremities of the rim 3 and retaining flange 2ª there are formed flanges 4, 4ª which co-operate with each other so as to secure the wheel parts together, while at the inner extremities of the parts 1 and 2 of the wheel, and on the inner sides thereof, there are formed flanges 5, 5ª by which the wheel is supported upon a hub 6, conveniently, by being mounted upon needle bearings 7 carried on the hub and upon a central thrust bearing 8 from which dirt and dust are excluded by caps 9 sprung over the opposed ends of the flanges 5, 5ª.

Alternatively, the thrust bearing may, as shown in Figure 7, be directly associated with each of the needle bearings so as to form a combined thrust and journal bearing having a common race, consisting of a ring 10 provided on one of its faces with an inwardly directed flange 11 and on its opposite face with a further flange 12 which extends both inwardly and outwardly of the ring. The needle bearings 7 bear against the inner surface of the ring and are engaged between the flange 11 and the inwardly directed portion 12ª of the flange 12 while the ball bearings 8 engage between the flange 12 and a radial flange 13 formed at the end of the hub. One such combined journal and thrust bearing may be provided at each side of the wheel as shown.

The flanges 4, 4ª are formed to overlap each other, one flange being, conveniently, shorter than the other, and at the overlap these flanges are formed with alternate castellations 14 and recesses 15 more clearly shown in Fig. 6 and extending circumferentially around the flanges so that the co-operating surfaces of the flanges are of generally castellated form. The arrangement is such that the castellations on one flange may be brought into register with the recesses in the other flange (in which position the two wheel parts may be separated), or may be engaged with the castellations on the other flange (in which position separation of the two wheel parts is precluded), this relative positioning of the castellations 14 and recesses 15 being accomplished by rotating one wheel part relatively to the other. The engagement of the castellations on the two flanges may be accomplished by providing interengageable teeth 16, 16ª on the co-operating castellations. The body part 2 is provided circumferentially with a seat 35 on which both flanges 2ª and 4 are seated, the engaging surfaces of the part 2 and the flanges 2ª and 4 being of corresponding conical form.

With a wheel as above described, the outermost part 1 thereof would be the one which would be removed and bolts 21 or other securing means may be provided for securing this part at the centre to the wheel hub, these bolts being, of course, readily removable.

On the side of the other wheel part 2 there may be provided a housing 22 for a brake mechanism. This housing follows the stream-line of the wheel and the brake may, conveniently, be of the same general construction as is described in my British patent specification No. 390,505 but modified in that the flexible brake discs 23 and the fluid capsule 24 for actuating same will, in the present brake, be formed so as to follow the required stream-line shape of the wheel. The same would apply to the centering frame provided in accordance with my copending British patent application No. 7,083 of 1933 if such frame were provided in the present brake.

A locking pin 27, any number of which may be provided, is pivoted at 28 upon the flange 4 of the wheel part 1 and is formed to extend within complementary recesses 29, 29ª formed on the engaging surfaces of the parts 2, 4 and 2ª so as to lock these parts together.

When it is desired to detach the rim flange 2ª from the flange 4 the wheel part containing the latter and also the rim flange 1ª are removed bodily from the wheel part 2 together with the locking pins 27 which, upon leaving the recesses 29ª, on the wheel part 2, are then free to be moved out of the other recesses 29 in order to permit of the flange 2ª being removed from the flange 4 by relative rotational movement of these parts.

Figure 2 shows the parts 4 and 2ª removed from the part 2 and the full line position of the pin 27 in this figure is that in which the part 2ª may be removed from the part 4 while the dotted position of the pin is that which it assumes when it is desired to attach the assembled parts 4 and 2ª to the wheel part 2, the pin being automatically locked in this position, for example, by resilient ball catches 30 provided on the flange 4 for engagement with recesses 30ª in the sides of the locking pin.

It is to be understood that the invention is not limited to the above details but is capable of modification to meet any particular requirements or practical conditions it may be desired to fulfil.

I claim:

1. A vehicle wheel comprising separable wheel body parts, detachable rim parts carried by one of said body parts, cooperating castellations on said rim parts each consisting of a plurality of ribs disposed parallel to each other, a conical seating for both detachable rim parts on the other body part, and a locking member interlocking the rim parts together and with the second mentioned body part.

2. A vehicle wheel as claimed in claim 1, characterized in that the second mentioned body part and said rim parts are formed with recesses accommodating said locking member.

3. A vehicle wheel as claimed in claim 1, characterized in that the second mentioned body part and said rim parts are formed with recesses accommodating said locking member, said recesses being disposed in parallel relation to the axis of the wheel whereby the rim parts may be removed axially from the second mentioned body part.

4. A vehicle wheel as claimed in claim 1, characterized in that the locking member is pivotally mounted and engaged in a recess formed in the second body part, said rim parts also having registering recesses therein receiving said locking member, said locking member being adapted to be withdrawn from the recess in the second mentioned body in the axial direction and adapted when swung about its pivot, to be withdrawn from the recesses in the rim parts.

WILLIAM LEICESTER AVERY.